US007778931B2

(12) United States Patent
Rits

(10) Patent No.: US 7,778,931 B2
(45) Date of Patent: Aug. 17, 2010

(54) METHOD AND A SYSTEM FOR SECURING PROCESSING OF AN ORDER BY A MOBILE AGENT WITHIN A NETWORK SYSTEM

(75) Inventor: Maarten E. Rits, Nice (FR)

(73) Assignee: SAP AG, Walldorf (DE)

( * ) Notice: Subject to any disclaimer, the term of this patent is extended or adjusted under 35 U.S.C. 154(b) by 220 days.

(21) Appl. No.: 11/804,648

(22) Filed: May 18, 2007

(65) Prior Publication Data

US 2007/0286424 A1 Dec. 13, 2007

(30) Foreign Application Priority Data

May 26, 2006 (EP) ................................ 06290876

(51) Int. Cl.
*G06F 21/00* (2006.01)
*G06F 11/30* (2006.01)
*H04L 9/32* (2006.01)

(52) U.S. Cl. ........................... 705/64; 713/170; 713/187

(58) Field of Classification Search ................ 705/1–80
See application file for complete search history.

(56) References Cited

U.S. PATENT DOCUMENTS

| | | | | |
|---|---|---|---|---|
| 6,990,582 | B2 * | 1/2006 | Maruyama | ................... 713/170 |
| 7,213,047 | B2 * | 5/2007 | Yeager et al. | ............... 709/202 |
| 7,228,426 | B2 * | 6/2007 | Sinha et al. | .................. 713/176 |
| 7,275,102 | B2 * | 9/2007 | Yeager et al. | ............... 709/224 |
| 7,287,166 | B1 * | 10/2007 | Chang et al. | ................ 713/187 |
| 7,328,243 | B2 * | 2/2008 | Yeager et al. | ............... 709/205 |
| 7,430,670 | B1 * | 9/2008 | Horning et al. | ............. 713/190 |
| 2001/0016911 | A1 * | 8/2001 | Obana | ........................ 713/180 |
| 2002/0144118 | A1 * | 10/2002 | Maruyama | ................... 713/170 |
| 2004/0037423 | A1 * | 2/2004 | Ghanea-Hercock | ......... 380/270 |
| 2004/0088646 | A1 * | 5/2004 | Yeager et al. | ............... 715/500 |
| 2004/0123116 | A1 * | 6/2004 | Jin et al. | ..................... 713/187 |
| 2005/0141706 | A1 | 6/2005 | Wegli et al. | |
| 2005/0232429 | A1 * | 10/2005 | Chowdhury et al. | ........ 380/277 |
| 2005/0289650 | A1 | 12/2005 | Kalogridis | |

FOREIGN PATENT DOCUMENTS

DE  10023818 A1  11/2001
JP  2000031958 A  1/2000

(Continued)

OTHER PUBLICATIONS

"European Search Report, Application No. 06290876.9", (Sep. 29, 2006),2 pgs.

(Continued)

*Primary Examiner*—Andrew J. Fischer
*Assistant Examiner*—Murali Dega
(74) *Attorney, Agent, or Firm*—Brake Hughes Bellermann LLP

(57) ABSTRACT

The present description refers to a method for securing processing of an order by a mobile agent from a first server ($S_o$) within a network system with a plurality of servers ($S_o$, $S_1$, ..., $S_n$), at least a number of which the mobile agent has to pass according to an appropriate succession, wherein each of the plurality of servers has a pair of a public key ($KS_o$, ..., $KS_i$, ..., $KS_n$) and a private key ($PKS_o$, ..., $PKS_i$, ..., $PKS_n$) associated therewith, respectively, the method comprising, starting from any one of the number of servers the mobile agent has to pass, called herein the i'th server at least the steps of receiving the mobile agent which has been prepared by the first server by choosing a unique number (r0) and assigning it to the mobile agent, encoding the chosen unique number (r0) with the private key ($PKS_o$) of the first server ($S_o$), thus forming an agent specific initialisation number ($C_o$) as basis for a sequence of checksums ($C_o$, ..., $C_i$, ..., $C_n$) to be computed successively by the number of servers ($S_o$, $S_1$, ..., $S_n$), sending the mobile agent together with its initialisation number ($C_o$) on its route through the network system for processing the order passing thereby the number of servers ($S_o$, $S_1$, ..., $S_n$) successively, and initiating each server ($S_1$, ..., $S_n$) from which the mobile agent intends to take data with it when passing that server to encode the initialisation number ($C_o$) together with the data with the respective server's private key ($PKS_1$, ..., $PKS_i$, ..., $PKS_n$) and to compute therewith a new server specific checksum ($C_1$, ..., $C_i$, ..., $C_n$) using the public key ($KS_o$) of the first server ($S_o$) and the checksum ($C_o$, ..., $C_i$, ..., $C_{n-1}$) computed by the server ($S_o$, ..., $S_{n-1}$) right before in the succession.

8 Claims, 3 Drawing Sheets

FOREIGN PATENT DOCUMENTS

| | | |
|---|---|---|
| JP | 20010077858 A | 9/2002 |
| JP | 2002305513 A | 10/2002 |
| JP | 2005149205 A | 6/2005 |
| WO | WO-2004046846 A2 | 6/2004 |

OTHER PUBLICATIONS

"European Search Report, Application No. 06290878.5", (Oct. 18, 2006), 2 pgs.

Ametller, S. Robles "Self-Protected Mobile Agents," AAMAS/04 Jul. 19-23, 2004, New York, New York USA—6 pages.

Hohl, Fritz , "Time Limited Blackbox Security: Protecting Mobile Agents from Malicious Hosts", *In Giovanni Vigna, Mobile Agent Security*, Springer-Verlag, (1998), 92-113.

Karnik, Neeran , et al., "Security in the Ajanta mobile agent system", *In Software, Practice and Experience*, 31(4), Neeran M. Karnik and Anand R. Tripathi. Security in the Ajanta mobile agent system. Software, Practice and Experience, 31(4), (2001), 301-329.

Negm, K E A, "Design, implementation and testing of mobile agent protection mechanism for MAMETS", *Computer Systems and Applications 2005, The 3rd ACS/IEEE*, (Jan. 3, 2005).

Park, Jong-Youl, "On-Time Key Generation System for Agent Data Protection," *IECIE Trans. Inf. & Syst.*, vol. E85—D, No. 3 Mar. 2002).

Roth, Volker , "On the Robustness of Some Cryptographic Protocols for Mobile Agent Protection", *In Mobile Agents : 5th International Conference, MA 2001 Atlanta, GA, USA, Dec. 2-4, 2001 Computer Science*, vol. 2240/2001 Book Mobile Agents : 5th International Conference, MA 2001 Atlanta, GA, USA, Dec. 2-4, 2001. Proceedings, (2001), 0302-9743 (Print) 1161-3349 (Online).

Sander, T , et al., "Towards Mobile Cryptography", *In Proceedings of the IEEE Symposium on Security and Privacy*, Oakland, CA, (1998).

Wilhelm, U G., et al., "Introducing Trusted Third Parties to the Mobile Agent Paradigm", In J. Vitek and C. Jensen, *Secure Internet Programming: Security Issues for Mobile and Distributed Objects*, vol. 1603, (1999), 471-491.

Yee, Bennet , "Using Secure Coprocessors", *PhD Thesis*, (May 1994).

\* cited by examiner

METHOD AND A SYSTEM FOR SECURING PROCESSING OF AN ORDER BY A MOBILE AGENT WITHIN A NETWORK SYSTEM

CLAIM OF PRIORITY

The present patent application claims the priority benefit of the filing date of European Application (EPO) No. 06290876.9 filed May 26, 2006, the entire content of which is incorporated herein by reference.

TECHNICAL FIELD

This description refers to the field of mobile agent technology, particularly to mobile agent security in network systems.

DESCRIPTION OF THE RELATED ART

In computer science, a mobile agent is a composition of computer software and data which is able to migrate from one server to another autonomously and continue its execution on a destination server. A mobile agent inherits some of the characteristics of an agent. An agent is a computational entity which acts on behalf of other entities in an autonomous fashion, performs its actions with some level of proactivity and/or reactiveness and exhibits some level of key attributes of learning, co-operation and mobility. A mobile agent, namely, is a type of a software agent, with the feature of autonomy, social ability, learning, and most important, mobility. When the term mobile agent is used, it refers generally to a process that can transport its state from one environment to another, with its data intact, and still being able to perform appropriately in the new environment. The mobile agent environment is generally spoken a software system which is distributed over a network system of heterogeneous servers. Its primary task is to provide an environment in which mobile agents can execute. The mobile agent environment is built on top of a host system. Mobile agents travel between mobile agent environments. They can communicate with each other either locally or remotely. Finally, communication can also take place between a mobile agent and a host service. Mobile agents are active in that they may choose to migrate between servers at any time during the execution. This make them a powerful tool for implementing distributed applications in a network system. During their route through the network system mobile agents can carry data with them. These data can be data that is necessary for their execution on a certain server and results from calculations that have been performing on a certain server. The route of a mobile agent can be defined in advance, or the mobile agent can adapt its route on its way based on certain events. After the completion of their tasks most mobile agents return to their departure point to return the results they gathered.

There are quite a lot of advantages of using mobile agents which are described in the following. Mobile agents reduce network traffic. Some applications first download a large amount of data from a server and then process this data to a smaller amount, e.g. search and filter applications like for example data-mining. If one would use mobile agents for these programs, then these mobile agents would be able to execute the work on the server itself, without congesting the network system because only the results of the calculation will be sent back.

Furthermore, by means of mobile agents, an asynchronous and autonomous execution on multiple heterogeneous network servers is possible. Some applications need a large amount of client-server interactions which can be done through classic client-server method invocations or with web services used in a so-called Enterprise Services Architecture (ESA). Also in this case mobile agents can be more efficient. A mobile agent can work asynchronously and autonomously while the system that sent the mobile agent is no longer connected to the network system. Mobile servers like laptops and PDAs, that mostly have an uncertain and expensive connection with relative low bandwidth, can therefore make proper use of mobile agents.

Moreover, mobile agents have the possibility to adopt themselves to changes in their execution environment. This is why mobile agents can be used for example in load-balancing. When a server is starting to become overloaded, some processes can be placed to another server within the network system in form of a mobile agent, where they can continue the execution. Also other application scenarios exist where intelligent agents can make efficient decisions based on the changing execution environment. An e-business scenario with mobile agents would allow, for example, to find the cheapest price for an airplane ticket, car rental and hotel booking. Most airlines have deals with car rental companies and hotels. This information is available when the mobile agent will visit the server of the airline company. The mobile agent will collect the prices of the airplane ticket and then continues his route to the service of cooperating car rental companies and hotels.

As already mentioned, the use of mobile agents is tolerant to network faults. Mobile agents are able to operate without an active connection between a client and a server.

Common applications of mobile agents include for example resource availability, discovery, monitoring, information retrieval, network management and dynamic software deployment.

If one wants to execute a mobile agent on a server, then this mobile agent comes under the complete control of the server. If a server has malicious intentions and wants to change the mobile agent or simply delete the mobile agent, this is impossible to prevent. However, it should be tried to make targeted, malicious changes impossible by applying detection mechanisms. With cryptographic techniques one can try to make sure that the server cannot read information that is not targeted towards him. The fact that the mobile agent travels from one server to another causes, however, that classic methods are not sufficient anymore to protect these mobile agents.

There are some existing methods to protect mobile agents against servers. Generally, there are two categories of existing methods to protect mobile agents against servers, namely so-called Blackbox methods and Partial Protection methods.

The goal of Blackbox methods is to hide the whole program code of a mobile agent for a server, so that the intention of the mobile agent is not clear and the server will not be able to make targeted modifications. There are basically three different approaches in this category.

A first approach can be called "Tamper-free Hardware". One uses here a special manufactured tool as execution environment for the mobile agents. The internal specifications of the system are physically separated from the outside world and impossible to maintain without damaging the tool, which can be easily verified. This approach gives a very good protection. However, it is practically unacceptable on a large scale because of the high manufacturing costs. For more information reference is made to "U. G. Wilhelm, S. Staamann, L. Buttyan. Introducing Trusted Third Parties to the Mobile Agent Paradigm. In J. Vitek and C. Jensen, Secure Internet Programming: Security Issues for Mobile and Distributed Objects, volume 1603, pages 471-491. Springer-Verlag, New York, N.Y., USA, 1999" and "Bennet Yee. Using Secure Coprocessors. PhD Thesis, May 1994".

A further approach can be called "Obfuscated Code". This approach tries to rearrange the code of the mobile agent in such a way that it becomes incomprehensible, but still has the same effect. The technique is closely related to obfuscation techniques to prevent reverse engineering. At this moment there is no method that makes the code incomprehensible infinitely in time. If one has enough processing capacity, one can rediscover the signification of the code. A less strict variant of this approach is the time limited protection, i.e. the obfuscated code is only valid for a certain period in time, after that the mobile agent becomes invalid. A large problem here is that one has not yet defined ways to calculate the effectiveness of the obfuscation algorithms. In other words, it is not possible to calculate an underlimit for the time. More information can be found in "Fritz Hohl. Time Limited Blackbox Security: Protecting Mobile Agents from Malicious Hosts. In Giovanni Vigna, Mobile Agent Security, pages 92-113. Springer-Verlag. 1998".

A further approach refers to Mobile Cryptography. Suppose one has an algorithm to calculate a function f and one wants to know from a certain input value x the function value f(x) on a server without the server knowing f. This would be possible if one could encrypt f in a way that E[f(x)], the function value of x calculated with the encrypted function, could be decrypted back to f(x). This technique is very promising, but the biggest challenge remains to develop encryption schemas E for arbitrary functions f. For now E exists only for certain classes of polynomials and rational functions as it is described in reference "T. Sander and C. Tschudin. Towards Mobile Cryptography. In Proceedings of the IEEE Symposium on Security and Privacy, Oakland, Calif., 1998".

Instead of covering the whole mobile agent for the servers in the approach of partial protection, part of the mobile agent will be protected, like confidential information that the mobile agent carries with him. In this case, however, the servers can perform targeted attacks against the mobile agents, which was not possible with blackbox methods. The mobile agents are vulnerable to so-called cut-and-paste attacks. One can remove data from a mobile agent and use another mobile agent to get to know the confidential information.

In the following, such a partial protection method which is still vulnerable to a cut-and-paste attack will be described. The purpose of the existing method described in the following and further described in reference "Green, S., Somers, F., Hurst, L., Evans, R., Nangle, B., Cunningham, P.; Software agent: A review, May (1997)" is to add data that an agent finds on a server to a secure data container. It is assumed in the following that the servers within the network system are all provided with a pair of a public key and a private key, respectively. Also the server from which the mobile agent is sent out, in the following called the first server, has a public key and a private key. Before sending a mobile agent on its route through the network system a nonce $N_o$ is first encrypted with the public key of the first server, namely the server from which the mobile agent will be sent out. Within the scope of the present specification the term first server, agent owner and the server from which the mobile agent is sent out are used synonymously. The encrypted nonce $N_o$ is kept secret and thus only known by the first server and can be written as follows:

$$C_o = \{N_o\} KS_0 \quad (1)$$

wherein $N_o$ is the mentioned nonce, $KS_0$ is the public key of the first server and $C_0$ is the encrypted nonce.

When the mobile agent wants to take data $X_i$ with it from a certain server $S_i$, the mobile agent asks the respective server $S_i$ to sign the data $X_i$ with its private key. Thus, a new checksum is being calculated which can be described by the following mathematical term:

$$C_i = \{C_{i-1}, [X_i] PKS_i, S_i\} KS_0 \quad (2)$$

wherein $C_i$ describes the i'th checksum, $C_{i-1}$ the i−1'th checksum, $X_i$ the data the mobile agent wants to take with it from the server $S_i$, $PKS_i$ the private key of server $S_i$, $S_i$ a server code of the server $S_i$ and $KS_0$ the public key of the first server from which the mobile agent is sent out.

The mobile agent carries now the data which it takes from different servers on its route through the network system and the actual checksum which is calculated successively on the different servers. The data may be kept in a data container. The data the mobile agent takes with it remain visible to the other servers. If one wants to prevent this one can encrypt the data with the public key of the first server. When the mobile agent returns home, i.e. to the first server, it can be checked by the first server if the mobile agent has been modified on its route through the network system. To do this one proceeds in the other direction by deflating the checksum and verifying the signature on the data which can be described by the following mathematical term:

$$\{C_i\} PKS_0 = C_{i-1}, [X_i] PKS_i, S_i \quad (3)$$

wherein $C_i$ is the i'th checksum, $PKS_0$ is the private key of the first server, $C_{i-1}$ is the i−1'th checksum, $X_i$ is the data the mobile agent has gathered from the server $S_i$, $PKS_i$ is the private key of server $S_i$ and $S_i$ is a server code of server $S_i$ itself.

When at a certain point a verification of the signature fails the data that has been checked so far can be regarded as trustable, but the data further contained in the remaining checksum cannot be trusted anymore. When finally the whole checksum has been successfully deflated, one should get the nonce $N_o$ so that it is certain that the data container is part of the mobile agent and it is not the data container of another mobile agent.

This described method makes use of classic cryptographic techniques to protect a data transfer of a mobile agent. However, since the mobile agents migrate from one server to another before returning to their home server, the mobile agents need additional protection. This will become clear from the description of the following attack.

It is assumed in the following that a first server $S_0$ sends out a mobile agent which is intended to reach a specific server B. On its way through the network the mobile agent from server $S_0$ arrives at an intermediary server E. It is supposed that server E gets the mobile agent from server $S_0$ and that server E knows an old value of a checksum $C_i$ of a sequence of checksums $C_1$ to $C_n$ wherein i is smaller that n. This is possible for example if there is a loop in the route of the mobile agent on its way through the network system or if server E collaborates with another server where the mobile agent already went on its route through the network. Server E can now just starting from the i'th element, leave elements out of the data container, change or add elements in the name of other servers. To do this server E makes its own mobile agent that carries a message $X_{i+1}$ with it that server E wants to add at the i+1'th position and its own data container. Server E sends its own mobile agent with program code PE together with the checksum $C_i$ to server B which can be described as follows:

$$E => B: PE, X_{i+1}, C_i \quad (4)$$

The mobile agent of server E asks server B to sign the data with its private key and to calculate a new checksum $C_{i+1}$ and to give it back to the mobile agent which then returns back to server E which can be described as follows:

$$B => E: PE, C_{i+1} = \{C_i, [X_{i+1}] PKB, B\} KE \quad (5)$$

wherein PE is the program code of the mobile agent of server E, PKB is the private key of server B, KE is the public key of server E, $C_{i+1}$ and $C_i$ are the respective checksums and $X_{i+1}$ are the data server E wants to add at the i+1'th position.

That means that server E sends its mobile agent to server B in order to let server B add the message $X_{i+1}$ to the data container. When the mobile agent gets back home to server E, server E decrypts the checksum with its private key and encrypts it again with the public key from server $S_0$. Server E can in this way continue until it is satisfied with the result. Then it can release the mobile agent from server $S_0$ with the forged data container and send it back to server $S_0$ which can be described as follows:

$$E => S_0: PS_0, C_{i+1} = \{C_i, [X_{i+1}]PKB, B\}KS_0 \quad (6)$$

wherein $PS_0$ is a program code of the mobile agent from server $S_0$, $KS_0$ is the public key of server $S_0$ and $C_{i+1}$ and $C_i$ are the respective checksums. Server $S_0$ has no possibility to detect the malicious behavior of server E.

It would be desirable now to find a possibility to avoid such kind of attacks completely.

DETAILED DESCRIPTION OF THE DRAWINGS

Figure 1:
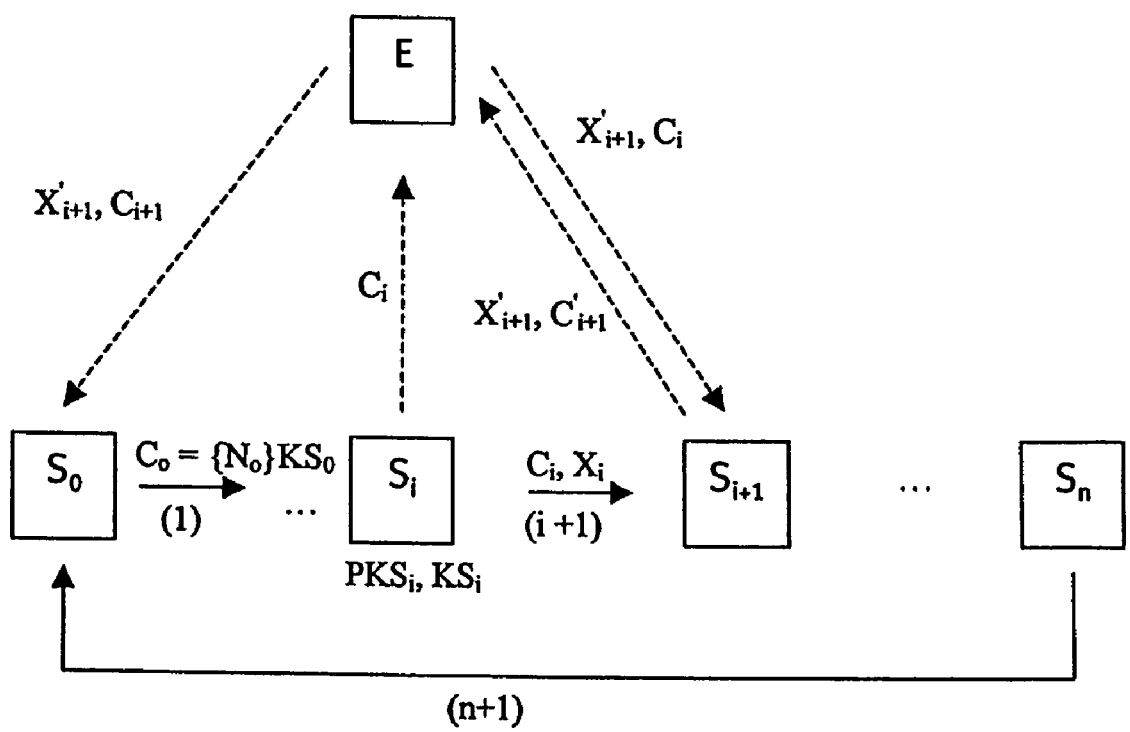
FIG. 1 shows a possible scenario of a data gathering and a data transfer by a mobile agent which may be vulnerable to an attack as it is known from the prior art.

According to one aspect, a method is provided for securing processing of an order by a mobile agent from a first server within a network system with a plurality of servers, at least a number of which the mobile agent has to pass according to an appropriate succession wherein each of the plurality of servers has a pair of a public key and a private key associated therewith, respectively, the method comprising, starting from any one of the number of servers the mobile agent has to pass, called herein the i'th server, at least the following steps:

receiving the mobile agent which has been prepared by the first server by choosing a unique number and assigning it to the mobile agent, encoding the chosen unique number with the private key of the first server, thus forming an agent specific initialization number as basis for a sequence of checksums to be computed successively by the number of servers, and sending the mobile agent together with its initialization number on its route through the network system for processing the order passing thereby the number of servers successively, encoding in case that the mobile agent intends to take data with it when passing the i'th server the initialization number together with the data with the i'th server's private key and computing therewith a new server specific checksum using the public key of the first server and the checksum computed by the server right before in the succession, and sending the mobile agent further to the next server within the succession.

According to another aspect, it is provided a network system for providing a secure processing of an order by a mobile agent from a first server, the first server having a pair of a private key and a public key and, for processing the order, the mobile agent being associated with a unique number encoded by said private key, the network system further comprises a plurality of servers, at least a number of which the mobile agent has to pass according to an appropriate succession for processing the order, wherein each of the plurality of servers has a pair of a public key and a private key associated therewith, respectively, and is configured to encode the encoded unique number together with data the mobile agent intends to take with it when passing that server with the respective server's private key and to compute therewith a new server specific checksum using the public key of the first server and the checksum computed by the server right before in the succession.

In still another aspect, it is provided a mobile agent from a first server providing a secure processing of an order within a network system with a plurality of servers, at least a number of which the mobile agent has to pass according to an appropriate succession, wherein each of the plurality of servers has a pair of a public key and a private key associated therewith, respectively, and wherein the mobile agent gets, when starting processing the order, associated with a unique number which is encoded with the private key of the first server thus forming an agent specific initialization number as basis for a sequence of checksums to be computed successively by the number of servers when being passed by the mobile agent on its route through the network system for processing the order, each checksum being further encoded by the public key of the first server.

According to a possible embodiment of the method the data the mobile agent takes with it from servers on its route through the network is encoded by the public key of the first server. Thereby, it can be avoided that the data remains visible to other servers when the mobile agent is on its route through the network system.

It is also possible that the data the mobile agent gathers on its route through the network when processing the order are collected within a data container which is associated with the mobile agent.

Furthermore, it is possible that the sequence of checksums is defined by the following functional rule:

$$C_i = \{C_{i-1}, [X_i, [r0]PKS_0]PKS_i, S_i\}KS_0 \quad (7)$$

wherein $C_i$ is the i'th checksum, $X_i$ is the data from the i'th server, r0 is the unique number, $PKS_0$ is the private key of the first server, $KS_0$ is the public key of the first server, $PKS_i$ is the private key of the i'th server, $S_i$ is a code number of the i'th server, i is a positive integer value.

It is assumed that the mobile agent has to pass for processing its order a succession of n servers 1, . . . , n, wherein n is a positive integer value. In the functional rule described above, i should be smaller or equal to n. r0 is the unique number which has not to remain secret. $[r0]PKS_0$ corresponds to a signature from the first server from which the mobile agent is sent out.

Coming back to the exemplary attack mentioned before, the same scenario can be described and the attack as described before can be avoided by means of an implementation as follows:

When a mobile agent wants to take data with it from a certain server $S_i$, the new checksum $C_i$ is, as already described, the following:

$$C_i\{C_{i-1}, [X_i, [r0]PKS_0]PKS_i, S_i\}KS_0 \qquad (8)$$

It is clear that the previously described attack is not possible anymore. It is supposed again that server E gets the mobile agent from the first server $S_0$ and that server E knows an old value of the checksum $C_i$ with i<n. This is possible, as already indicated before, if there is, for example, a loop in the route of the mobile agent or if server E collaborates with another server where the mobile agent already went. If server E uses the checksum $C_i$ and the unique number from server $S_0$ in its own mobile agent then the unique number r0 gets signed with the private key of server E which is described by [r0] PKE. Server B which is asked by the mobile agent from server E to compute a new checksum by adding the data $X_{i+1}$ will determine the checksum as follows:

$$C_{i+1} = \{C_i, [X_{i+1}, [r0]PKE]PKB, B\}KE \qquad (9)$$

In the originally proposed method the data container was initialized with $\{N_0\}KS_0$ to be able to check in the end if the data container truly belonged to this respective mobile agent and to prevent a server of generating its own data container. This mechanism was flawed. By using the new computational rule for computing the checksum this can be avoided. When server E receives the checksum it replaces its public key KE by the public key $KS_0$ of the first server. Since the signature from server E, namely [r0]PKE is further signed by the private key PKB of server B when computing the new checksum $C_{i+1}$, server E is not able to erase its private key PKE from the checksum, thus leaving a kind of fingerprint. Therefore, when server E sends the mobile agent from server $S_0$ together with the falsified data and the new checksum $C_{i+1}$ back to server $S_0$, server $S_0$ will immediately recognize that the data container is not part of its own mobile agent, but the data container of another agent. Finally, server $S_0$ can be sure that the data it gets by its own mobile agent have been tampered by any server on the mobile agent's route through the network.

It is possible that the unique number r0 which does not have to remain secret corresponds to a process identification number. That means that the chosen unit number can be at the same time associated to a specific order or process the mobile agent has to execute on its route through the network.

It is also possible that each checksum is deflated for verifying successively the respective keys on the data thus checking the unaffected and correct processing of the order.

In general, in another aspect, a computer program product with a computer-readable medium and a computer program stored on the computer-readable medium with a program code is provided wherein the program code is suitable for carrying out a method according to any implementation when the computer program is run on a computer.

In still a further aspect, a computer program with a program code is provided, the program code being suitable for carrying out a method according to any implementation and a computer-readable medium with a program stored thereon, the computer program comprising a program code, which is suitable for carrying out a method according to any implementation when the computer program is run on a computer.

Various implementations can be used in an e-business scenario for travel management for example on top of a SAP NetWeaver™ platform. Any other suitable platform can also be used for such a scenario, as for example IBM Websphere™. When someone wants to plan a trip, he first checks the web pages of some airline companies for the price of a flight, to pick the cheapest one out. Besides that airplane ticket one would also need to rent a car and a hotel for the trip. In reality, most airline companies have special deals with hotels and car rental services. The check for the cheapest combination of an airplane ticket, hotel and car rental is very time consuming for most people. By using a mobile agent, it is possible to automate this search. It is needed a mobile agent that carries the data of the trip with him and looks on the different agent-enabled SAP NetWeaver™ platforms for the needed information. Data that are sensitive for customers can now be protected by using an embodiment of the method or by using an implementation of the mobile agent. Data which are sensitive for customers can be, for example, credit card information, fidelity numbers, etc.

Further features and embodiments will become apparent from the description and the accompanying drawings.

For the purpose of clarity, the present discussion refers to an abstract example of a network system. However, the method and the system may operate with a wide variety of types of network systems including networks and communication systems dramatically different from the specific example as illustrated in the following drawings.

It should be understood that while one or more implementations are described in terms of a specific system, further implementations may have applications in a variety of communication systems, such as advanced cable-television systems, advanced telephone-networks or any other communication systems that would benefit from the system, the mobile agent or the method according to any implementation. It is intended that the system as used in this specification and claims is suitable for any communication system unless the context requires otherwise Implementations are schematically illustrated in the drawings by way of an example embodiment and are explained in detail with reference to the drawings. It is understood that the description is in no way limiting and is merely an illustration of various implementations.

FIG. 1 describes a scenario in which a mobile agent from a server So is sent out in order to process an order by passing a sequence of servers $S_1, \ldots, S_n$ within a network system. In FIG. 1 a partial protection method as known from the cited prior art is used to protect the mobile agent, particularly confidential information that the mobile agent carries with it.

Before sending the mobile agent on its route through the network in order to pass the succession of servers $S_1, \ldots, S_n$ the first server $S_0$, namely the owner of the mobile agent, encrypts a nonce $N_O$ with its public key $KS_0$. Each of the servers within the network system, including the first server as the owner of the mobile agent has a pair of a public key and a private key, respectively. The nonce $N_O$ is kept secret and thus only known by the first server $S_0$. The mobile agent is now sent out by the first server $S_0$ together with a first checksum $C_0$ which can be described as follows:

$$C_0 = \{N_0\}KS_0 \qquad (10)$$

wherein $C_0$ describes the first checksum, $N_0$ the nonce and $KS_0$ the public key of the first server $S_0$. The mobile agent migrates now through the network system and takes data with it from different servers in order to execute its task. When the mobile agent wants to take data $X_i$ with it from a certain server $S_i$ within the succession of servers $S_1, \ldots, S_n$ the mobile agent asks server $S_i$ to sign the data $X_i$ with its private key $PKS_i$.

Thereby, a new checksum on the basis of the originally checksum $C_0$ is being calculated as follows:

$$C_i = \{C_{i-1}, [X_i]PKS_i, S_i\}KS_0 \qquad (11)$$

wherein $PKS_i$ describes the private key of server $S_i$.

As indicated by arrow (i+1), the agent continues its route through the network by taking with it the data $X_i$ and the actual checksum $C_i$. Generally, the complete data the mobile agent carries and takes with it on its route through the network is kept in a data container. Therefore, data $X_i$ the mobile agent takes with it from server $S_i$ is added to that data container. For simplicity, FIG. 1 only indicates data $X_i$ but not the whole data container.

The data the mobile agent takes with it on its route remains visible to the other servers. It is possible to prevent this by encrypting the data with the public key $KS_0$ of the first server $S_0$ which has sent out the mobile agent. When the mobile agent returns home as indicated by arrow (n+1), it can be checked if the mobile agent has been modified. In this case one proceeds in the other direction by deflating the checksum and verifying the signature on the data successively. This can be described considering as example checksum $C_i$ as follows:

$$C_i PKS_0 = C_{i-1}, [X_i]PKS_i, S_i \qquad (12)$$

When at a certain point the verification of a signature fails, the data that had been checked so far can be regarded as trustable but the data further contain in the remaining checksum can not be trusted anymore. Finally the whole checksum has been successfully deflated one should get the nonce $N_0$ so that it is certain that the container is part of the mobile agent which has been sent out by server $S_0$ and it is not the container of another agent.

However, the servers can perform targeted attacks against the mobile agent as it will be described in the following. A malicious server will be described by server E. All contacts of server E with any other server of the system are indicated by dashed arrows, respectively.

Suppose that server E gets the mobile agent from the first server $S_0$ and server E knows an old value of the checksum $C_i$ (with i<n). This is possible as indicated in FIG. 1 if server E collaborates with another server where the mobile agent already went, which is in this case server Si. Server E can now just starting from the i'th element, leave elements out of the data container, change or add elements in the name of server $S_{i+1}$. To do this server E makes its own mobile agent that carries the message $X'_{i+1}$ with it that server E wants to add at the (i+1)-th position and its own data container and sends this mobile agent with checksum $C_i$ to server $S_{i+1}$. Server E lets server $S_{i+1}$ add the message $X'_{i+1}$ to the data container. When the mobile agent of server E gets back home to server E it takes with it data $X'_{i+1}$ and checksum $C'_{i+1}$ which corresponds to $C'_{i+1} = \{C_i, [X'_{i+1}]PKS_{i+1}, S_{i+1}\}KE$. Server E decrypts the checksum $C'_{i+1}$ with its private key PKE and encrypts it again with the public key from the first server $S_0$ thus generating checksum $C_{i+1} = \{C_i, [X'_{i+1}]PKS_{i+1}, S_{i+1}\}KS_0$. Then server E sends the mobile agent from the first server back to the first server $S_0$ together with the forged data container comprising data $X'_{i+1}$. The first server $S_0$ is not able by means of the checksum $C_{i+1}$ to discover the intervention of the unauthorized server E.

Figure 2:
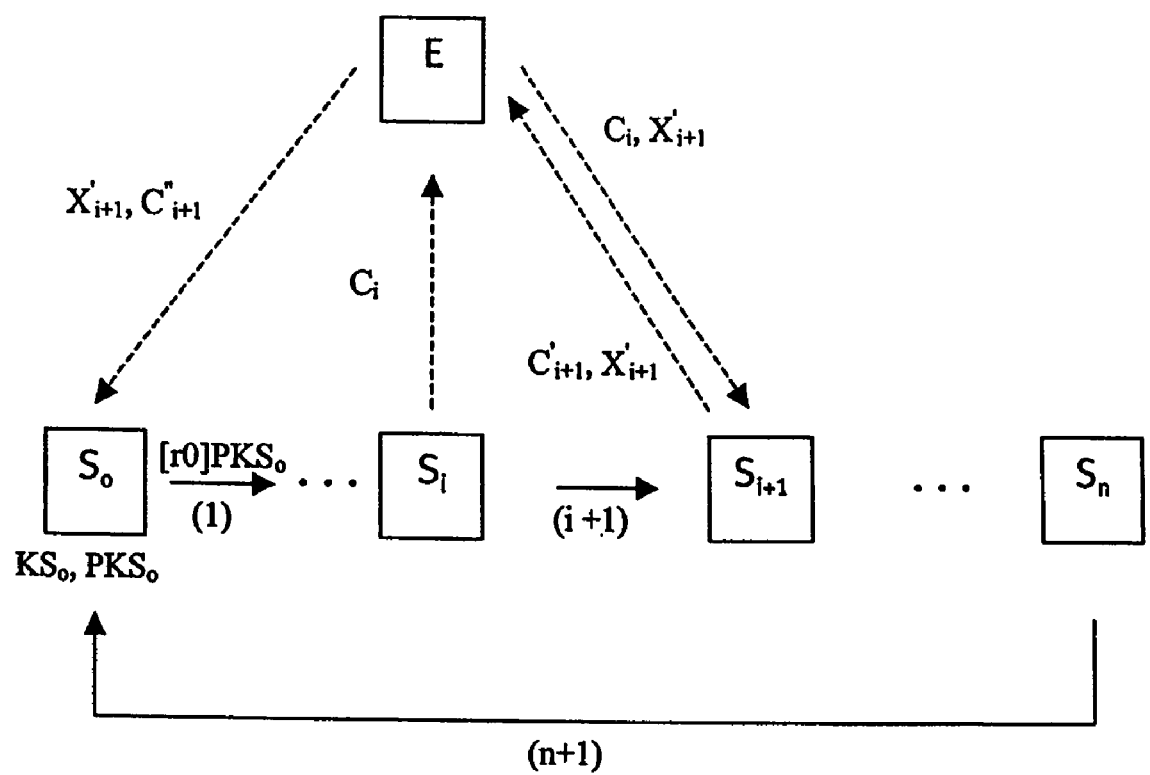
FIG. 2 shows a possible scenario of a data collecting and a data transfer by a mobile agent as it can be realized by a possible embodiment of a method, a system and/or a mobile agent according to any implementation.

FIG. 2 shows a similar scenario of a data collecting and a data transfer by a mobile agent within a network system. There is shown again a first server $S_o$ which sends out a mobile agent on its route through the network for processing an order. This order can be executed by the mobile agent by means of a specific succession of servers from which the mobile agent has to collect appropriate data. The succession of the servers is indicated by the labeling of the servers with $S_i, \ldots, S_i, S_{i+1}, \ldots, S_n$. The data are described accordingly by $X_1 \ldots, X_i, X_{i+1}, \ldots, X_n$. The first server which sends out the mobile agent is described by $S_0$. Before sending the mobile agent on its route a unique number r0 is chosen and assigned to the mobile agent. Each of the servers within the network system has a pair of a private key and a public key, respectively. When the first server $S_0$ wants to send out the mobile agent $S_0$ first encrypts that unique number r0 assigned to the mobile agent with its private key $PKS_0$. In comparison to the nonce $N_0$ which has been used in the method described with respect to FIG. 1, the unique number r0 does not have to remain secret.

It will be described now that the attack previously described with respect to FIG. 1 is not possible anymore in the scenario described in FIG. 2. It is supposed again that a server E gets the mobile agent from server $S_0$ and that server E knows an old value of the checksum $C_i$ with i<n. As indicated here this is possible, if server E collaborates with another server $S_i$ where the mobile agent already went. If server E wants now to add or to change or to delete elements out of the data the mobile agent takes already with it server E tries again to use another server, namely server $S_{i+1}$. Therefore, server E sends to server $S_{i+1}$ the data which server E wants to add, called here $X'_{i+1}$, because this data should be added in the name of server $S_{i+1}$. Furthermore, server E sends the checksum $C_i$ which server E knows from the server $S_i$ with which it collaborates. Server E also sends its program code as indicated by PE. Server $S_{i+1}$ computes now on the basis of the checksum $C_i$ received from server E a new checksum $C'_{i+1}$ as follows:

$$C'_{i+1} = \{C_i, [X'_{i+1}, [r0]PKE]PKS_{i+1}, S_{i+1}\} KE \qquad (13)$$

Server $S_{i+1}$ sends this checksum $C'_{i+1}$ back to server E. This checksum now contains the unique number r0 from the first server $S_0$ which server E has used in its own mobile agent and which has been signed by server E by means of its private key PKE. The checksum $C'_{i+1}$ contains now the message $X'_{i+1}$ server E wants to add and the signed unique number [r0]PKE which is altogether signed by the private key of server $S_{i+1}$. When server E wants to send the added message together with an appropriate checksum back to the first server, server E can only replace its public key KE by the public key of the first server $S_0$, but server E is not able to erase its private key PKE from the checksum because this part is signed by the private key of server $S_{i+1}$ which is not known by server E. Therefore, server E leaves a kind of fingerprint within the checksum $C''_{i+1}$ which is inerasable. Therefore, the first server $S_0$ will be able to detect the intervention of server E and therefore handle the data with a pinch of salt.

Figure 3:
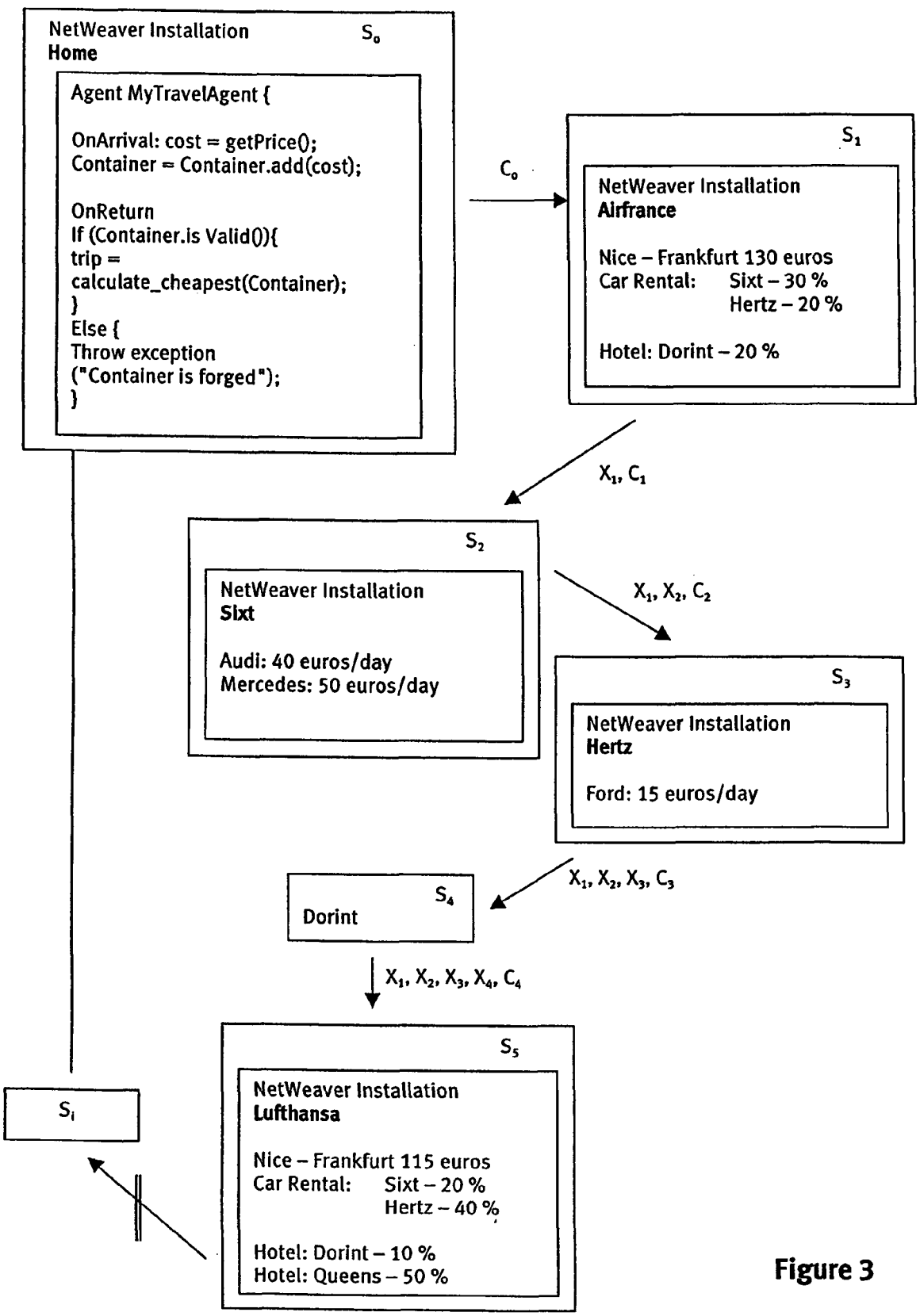
FIG. 3 shows a further possible scenario, namely a e-business scenario, in which an embodiment of a mobile agent according to a possible implementation can be used.

FIG. 3 shows a possible scenario in which one or more implementations can be used. It is shown here an e-business scenario for a travel management on top of a so-called SAP NetWeaver™ platform which is agent-enabled. When someone wants to plan a trip he first checks via a server $S_0$ the web pages of some airline companies for the price of a flight, to pick the cheapest one out. Besides an airplane ticket one often wants to rent a car and a hotel for the corresponding trip. In reality, most airline companies have special deals with hotels and car rental services. To check for the cheapest combination of airplane ticket, hotel and car rental, mobile agents can be used in order to automate this search. Therefore, the user of server $S_0$ needs a mobile agent that carries the data about the trip with it and looks on the different agent-enabled SAP NetWeaver™ platforms for the needed information. Each of the servers of the network system including the home server of the user, in the present case called the server $S_0$, has a pair of a private key and a public key, respectively. Before sending the mobile agent on its route through the network a unique number r0 is chosen and assigned to the mobile agent. This unique number is further signed by the server $S_0$ by means of its private key $PKS_0$. The data the mobile agent takes with it contains all information about the queries and requests for which the mobile agent has to collect appropriate information from an appropriate succession of servers. First the mobile agent visits a server $S_1$ of an airplane company, namely of the company "Airfrance". From this server $S_1$ the mobile agent gets the information, that a flight from Nice to Frankfurt costs 130 euros. Furthermore, it gets to know that Airfrance has a deal with the car rental company Sixt for getting a rebate of 30% and with the car rental company Hertz for getting a rebate of 20%. The flight company Airfrance has further a deal with the hotel Dorint for a rebate of 20%. The mobile agent collects all this information and before continuing its route to the next server the server of the flight company Airfrance is asked to compute a checksum which can be described as follows:

$$C_1 = \{C_0, [X_1, [r0]PKS_0]PKS_1, S_1\}KS_0, \quad (14)$$

wherein $C_0$ corresponds in the first step to $[r0]PKS_0$, $X_1$ is the data the mobile agent takes with it from the server $S_1$ of the flight company Airfrance, $PKS_1$ is the private key of the server $S_1$, namely the server of Airfrance and $S_1$ is the server code of the server of the flight company Airfrance. The data $X_1$ which the mobile agent takes with it is now encrypted together with the signed unique number r0 by means of the private key of server $S_1$. The mobile agent takes now the data $X_1$ together with the computed checksum $C_1$ with it on its route to the next server $S_2$ which is a server of the car rental company Sixt. From this server the mobile agent gets the information that a car Audi costs 40 euros per day, and Mercedes 50 euros per day. The mobile agent takes this information as information $X_2$ with it and asks before it continues its route server $S_2$ to compute a new checksum $C_2$ which is described as follows:

$$C_2 = \{C_1, [X_2, [r0]PKS_0]PKS_2, S_2\}KS_0 \quad (15)$$

Then the mobile agent goes to a server $S_3$ of the car rental company Hertz. The mobile agent gets from server $S_3$ the information that the car rental of a Ford costs 15 euros per day. The mobile agent asks server $S_3$ before continuing its route to the next server $S_4$ to compute a new checksum $C_3$ which is described as follows:

$$C_3 = \{C_2, [X_3, [r0]PKS_0]PKS_3, S_3\}KS_0 \quad (16)$$

Then the mobile agent goes to a server of the hotel Dorint as a server $S_4$. From server $S_4$ he gets the information about the hotel which was still lacking. Then the information is complete.

In order to look for the cheapest offer, the mobile agent goes further to search for an alternative. Therefore, it visits a server $S_5$, namely a server of an alternative airline company, namely Lufthansa. From server $S_5$ the mobile agent gets the information about the price of the flight Nice to Frankfurt about 115 euros. Furthermore, it gets the information that Lufthansa has a deal with the car rental company Sixt and Hertz. From Sixt Lufthansa gets a rebate about 20% and from Hertz a rebate about 40%. Furthermore, Lufthansa has a deal with the hotels Dorint and Queens, whereby Lufthansa gets a rebate from Dorint about 10% and from Queens about 50%.

The mobile agent again collects all this information and asks server $S_5$ to compute a new checksum before he leaves server $S_5$. The checksum $C_5$ reads as follows:

$$C_5 = \{C_4, [X_5, [r0]PKS_0]PKS_5, S_5\}KS_0. \quad (17)$$

The mobile agent leaves the server $S_5$ together with the collected information $X_5$ and the new checksum $C_5$. As indicated by $S_i$ the mobile agent can further migrate from one server to another until a certain condition is satisfied such as the cheapest and best offer has been found. Then the mobile agent returns back to its home server $S_0$ to report about the collected information.

The invention claimed is:

1. A method for securing processing of an order by a mobile agent from a first server ($S_o$) within a network system with a plurality of servers ($S_o, S_i, \ldots S_n$), wherein the mobile agent passes through at least two of the servers, and wherein each of the plurality of servers has a corresponding pair of a public key ($KS_o, \ldots, KS_i, \ldots, KS_n$) and a private key ($PKS_o, \ldots, PKS_i, \ldots, PKS_n$), and wherein any one of the at least two servers the mobile agent is currently stored on is called herein the i'th server, the method comprising:

assigning a unique number (r0) to the mobile agent, using the first server ($S_o$), encrypting the unique number (r0) with the private key ($PKS_o$) of the first server ($S_o$), at the first server, thus forming an agent specific initialisation number ($C_o$) as a first checksum ($C_o$) for a sequence of checksums ($C_o, \ldots, C_i, \ldots, C_n$) to be individually computed by the at least two servers of the plurality of servers ($S_o, S_1, \ldots, S_n$), sending the mobile agent together with its initialisation number ($C_o$) through the at least two servers of the plurality of servers ($S_o, S_1, \ldots, S_n$), thereby processing the order, encrypting, at the i'th server, the initialisation number ($C_o$) together with data ($X_i$) collected by the agent when passing the i'th server, using the i'th server's private key ($PKS_i$), computing, at the i'th server, a new server specific checksum ($C_i$) of the sequence of checksums ($C_o, \ldots, C_i, \ldots, C_n$), using the public key ($KS_o$) of the first server ($S_o$) and the checksum ($C_{i-1}$) computed by the server ($S_{i-1}$) from which the i'th server receives the mobile agent, and sending the mobile agent further to the next server ($S_{i+1}$) of the at least two servers of the plurality of servers ($S_o, S_1, \ldots, S_n$).

2. The method according to claim 1, wherein the data the mobile agent collects from the i'th server is encrypted by the public key ($KS_o$) of the first server ($S_o$).

3. The method according to claim 1, wherein the sequence of checksums is defined by the following functional rule: $C_i = \{C_{i-1}, [X_i, [r0]PKS_o]PKS_i, S_i\}KS_o$ wherein $C_i$ is the i'th checksum, $X_i$ is the data from the i'th server, r0 is the unique number, $PKS_o$ is the private key of the first server, $KS_o$ is the public key of the first server, $PKS_i$ is the private key of the i'th server, $S_i$ is a code number of the i'th server, i is a positive integer value.

4. The method according to claim 1, wherein the unique number (r0) is a process identification number.

5. The method according to claim 1, wherein each checksum ($C_i$) is used to be deflated by the first server for verifying the respective keys on the data thus checking the unaffected processing of the order when the mobile agent returns back to the first server ($S_o$).

6. A network system programmed for providing a secure processing of an order by a mobile agent from a first server, the first server ($S_o$) having a pair of a private key ($PKS_o$) and a public key ($KS_o$), the mobile agent being associated with a unique number (r0) encrypted with said private key ($PKS_o$) of the first server ($S_o$) to form an agent-specific initialization number ($C_o$), the network system further comprising;

a plurality of servers ($S_o, S_1, \ldots, S_n$) including the first server ($S_o$), at least two of which the mobile agent traverses during the processing of the order, wherein each of the plurality of servers ($S_o, S_1, \ldots, S_n$) has a corresponding pair of a public key ($KS_o, \ldots, KS_i, \ldots, KS_n$) and a private key ($PKS_o, \ldots, PKS_i, \ldots, PKS_n$), and wherein a second server ($S_1$) is programmed to encrypt the agent-specific initialization number ($C_o$) and any data collected from the second server ($S_1$) with the private key ($PKS_1$) of the second server ($S_1$) and the public key of the first server ($S_o$) to form a first server-specific checksum, and wherein each subsequent server of the network system is programmed to further encrypt the first server-specific checksum and any data the mobile agent collects when passing each subsequent server using each subsequent server's private key to thereby compute a new server specific checksum using the public key of the first server and the server-specific checksum computed by a preceding server from which each subsequent server receives the mobile agent.

7. A mobile agent including computer-readable instructions recorded on a non-transitory computer-readable storage medium, the mobile agent being from a first server ($S_o$) providing a secure processing of an order within a network system with a plurality of servers ($S_o, \ldots, S_i, \ldots, S_n$), at least two of which the mobile agent traverses during the processing, wherein each of the plurality of servers ($S_o, \ldots, S_i, \ldots, S_n$) has a pair of a public key ($KS_o, \ldots, KS_i, \ldots, KS_n$) and a private key ($PKS_o, \ldots, PKS_i, \ldots, PKS_n$), and wherein the mobile agent gets, when starting processing the order, associated with a unique number (rO), which is encrypted with the private key ($PKS_o$) of the first server ($S_o$) thus forming an agent specific initialisation number ($C_o$) as a first checksum ($C_o$) for a sequence of checksums ($C_o, \ldots, C_i, \ldots, C_n$) to be individually computed by each server of the at least two servers while the mobile agent is stored thereon, each checksum being further encoded by the public key ($KS_o$) of the first server ($S_o$).

8. A computer program product for securing processing of an order by a mobile agent from a first server ($S_o$) within a network system with a plurality of servers ($S_o, S_i, \ldots, S_n$), two of which the mobile agent traverses during the processing, wherein each of the plurality of servers has a pair of a public key ($KS_o, \ldots, KS_i, \ldots, KS_n$) and a private key ($PKS_o, \ldots, PKS_i, \ldots, PKS_n$), with reference to any one of the number of servers the mobile agent has to pass, called herein the i'th server, the computer program product embodied on a non-transitory computer-readable storage medium and including a computer program stored on the non-transitory computer-readable storage medium with a program code which, when executed by one of the at least two servers, is suitable to cause the one of the at least two servers to:

assign a unique number (r0) to the mobile agent, using the first server ($S_o$), encrypt the unique number (r0) with the private key ($PKS_o$) of the first server ($S_o$), at the first server, thus forming an agent specific initialisation number ($C_o$) as a first checksum ($C_o$) for a sequence of checksums ($C_o, \ldots, C_i, \ldots, C_n$) to be individually computed by the at least two servers of the plurality of servers ($S_o, S_1, \ldots, S_n$), send the mobile agent together with its initialisation number ($C_o$) through the at least two servers of the plurality of servers ($S_o, S_1, \ldots, S_n$) thereby processing the order, encrypt, at the i'th server, the initialisation number ($C_o$) together with data ($X_i$) collected by the agent when passing the i'th server, using the i'th server's private key ($PKS_i$), compute, at the i'th server, a new server specific checksum ($C_i$) of the sequence of checksums ($C_o, \ldots, C_i, \ldots, C_n$), using the public key ($KS_o$) of the first server ($S_o$) and the checksum ($C_{i-1}$) computed by the server ($S_{i-1}$) from which the i'th server receives the mobile agent, and send the mobile agent further to the next server ($S_{i+1}$) of the at least two servers of the plurality of servers ($S_o, S_1, \ldots, S_n$).

* * * * *